United States Patent
Honda et al.

(10) Patent No.: US 6,730,741 B1
(45) Date of Patent: May 4, 2004

(54) PROCESSING AID, VINYL CHLORIDE RESIN COMPOSITION CONTAINING THE SAME, AND PROCESS FOR PRODUCING MOLDED ARTICLE WITH THE SAME

(75) Inventors: Souichiro Honda, Hiroshima (JP); Akira Nakata, Hiroshima (JP); Ken Tsuchibe, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/926,558

(22) PCT Filed: May 18, 2000

(86) PCT No.: PCT/JP00/03185

§ 371 (c)(1),
(2), (4) Date: Feb. 1, 2002

(87) PCT Pub. No.: WO00/71616

PCT Pub. Date: Nov. 30, 2000

(30) Foreign Application Priority Data

May 19, 1999 (JP) ............................................. 11-138714

(51) Int. Cl.$^7$ ............................ C08L 27/06; C08L 33/12
(52) U.S. Cl. ....................................................... 525/228
(58) Field of Search .......................................... 525/228

(56) References Cited

U.S. PATENT DOCUMENTS

| | | | |
|---|---|---|---|
| 4,206,292 A | | 6/1980 | Ohya |
| 4,277,573 A | | 7/1981 | Iizuka et al. |
| 4,668,740 A | * | 5/1987 | Okano |
| 5,055,529 A | | 10/1991 | Kishida et al. |
| 5,093,420 A | | 3/1992 | Matsub et al. |

FOREIGN PATENT DOCUMENTS

| | | | |
|---|---|---|---|
| EP | 0132317 | | 1/1985 |
| JP | 47023443 | | 10/1970 |
| JP | 47034836 | | 11/1972 |
| JP | 54068890 | | 6/1979 |
| JP | 54112987 | | 9/1979 |
| JP | 54149788 | | 11/1979 |
| JP | 60-139739 | * | 7/1985 |
| JP | 05-140395 | * | 6/1993 |
| JP | 5-140395 | | 6/1993 |
| JP | 06-240086 | * | 8/1994 |
| JP | 04266958 | | 9/1998 |
| JP | 11228632 | | 8/1999 |

* cited by examiner

*Primary Examiner*—David J. Buttner
(74) *Attorney, Agent, or Firm*—Oblon, Spivak, McClelland, Maier & Neustadt, P.C.

(57) ABSTRACT

The present invention provides a processing aid that reduces ungelled products and flow marks generated on a sheet, and improves releasability of the sheet from the metallic surface of a roll, with the processing aid comprising:

a copolymer (A) obtained by copolymerizing a monomer mixture comprising 70 to 90% by weight of methyl methacrylate, 10 to 30% by weight of acrylate or methacrylate other than methyl methacryrate and a different type of monomer capable of being copolymerized with those monomers; and a copolymer (B) obtained by copolymerizing a monomer mixture comprising at least 30% by weight of methyl methacrylate and a monomer having as constitutional units at least one type selected from methacrylates other than methyl methacrylate, acrylates, aromatic alkenyl compounds and other monomers.

18 Claims, No Drawings

PROCESSING AID, VINYL CHLORIDE RESIN COMPOSITION CONTAINING THE SAME, AND PROCESS FOR PRODUCING MOLDED ARTICLE WITH THE SAME

TECHNICAL FIELD

The present invention relates to a processing aid for vinyl chloride based resin and a vinyl chloride based resin composition using the same, and more particularly to a processing aid for calender molding, which provides an effect of promoting gelation during calender molding of vinyl chloride based resin without giving damages to properties that the vinyl chloride based resin originally has, and can eliminate generation of ungelled products of a calendar sheet that are problematic in calender molding and flow marks that can hardly be eliminated by conventional processing aids, and also improves releasability of sheets from roll metal surfaces during calender molding, a vinyl chloride based resin composition for calender molding using the same, and a method of producing moldings using the same.

BACKGROUND ART

Vinyl chloride based resin are excellent in various kinds of physical properties and chemical properties, and are widely used for various kinds of products such as films, sheets, bottles, building materials, floor materials and wire coatings. However, for vinyl chloride based resin, the molding range is limited because the molding temperature is close to the thermal cracking temperature, and it is difficult to obtain uniform molten material from powder quickly by kneading operations and the like because the speed of gelation is low, often resulting in deteriorated surfaces of molten material. Many techniques aiming at overcoming these problems are known. They include, for example, addition of plasticizers, and copolymerization of vinyl chloride resin with other monomer. However, addition of plasticizers causes problems such as vaporization and escaping of plasticizers, and may compromise physical properties of final moldings. In the method using coplymerization of vinyl chloride resin with other monomer, the amount of monomer to be copolymerized should be limited for carrying out the copolymerization without giving no damages to the original properties of vinyl chloride resin, and if the amount thereof is too large, the physical properties of final moldings may be deteriorated as in the case of addition of platicizers.

On the other hand, for the purpose of improving so called processability such that gelation of resin is promoted during molding of vinyl chloride, the smoothness of the surface of the moldings is maintained even in long time molding, and the gloss of the surface Is kept constant, some of copolymers compatible with vinyl chloride resin are considered as processing aids, and method of blending these copolymers as processing aids. All of them are copolymers having methyl methacrylate as a main component. For vinyl chloride resins with these copolymers blended therein, the gelation speed is high and secondary processability is significantly improved, but there are disadvantages leading to degradation of commercial values of final moldings, for example generation of ungelled products due to their poor dispersion.

Then, as a method for enhancing the gelation speed of vinyl chloride resin, and curbing the generation of ungelled products due to poor dispersion of added processing aids, a vinyl chloride based resin composition is proposed in which a multi-stage copolymer comprising polymethyl methacrylate and a copolymer of a monomer superior in amount selected from the group consisting of acrylates and methacrylates other than methylmethacrylate and methylmethacrylate inferior in amount, or a polymer mixture with these polymers blended in latex conditions, or a multi-stage polymer comprising a copolymer obtained from methyl methacrylate superior in amount and a monomer inferior in amount selected from the group consisting of acrylates and methacrylates other than methyl methacrylate, and a copolymer obtained from methyl methacrylate inferior in amount and a monomer superior in amount selected from the group of consisting of acrylates and methacrylates other than methyl methacrylate, or a polymer mixture with these polymers blended in latex conditions are blended as processing aids (Japanese Patent Publication No. 52-49020, Japanese Patent Publication No. 53-2898).

In addition, it is also proposed that a multi-stage polymer with the diameter of particles of latex defined is used when a processing aid is prepared by emulsion polymerization (See Japanese Patent No. 2515014).

Vinyl chloride based resin compositions with a processing aid comprising such specific copolymers described in the above publication have improved properties in terms of generation of ungelled products and secondary processability.

For improving secondary processability while promoting gelation, however, the molecular weight of the processing aid should be large. For this reason, the melting viscosity of the resin composition during molding is increased, thus rising a disadvantage that flow marks are generated on the surface of calendar sheets during calender molding, resulting in degradation of the commercial value of moldings at the same time.

For the purpose of improving the above described problems, a vinyl chloride based resin composition is proposed in which a copolymer comprising methyl methacrylate and specific methacrylate is blended as a processing aid (See Japanese Patent No. 2813248).

On the other hand, the copolymer having methyl methacrylate as a main component also has a disadvantage that its stickiness to metal surfaces is essentially high, which leads to poor releasability of sheets from the metallic surface of a roll.

For the purpose of improving the releasability of sheets from the metallic surface of a roll in calender molding, use of various kinds of lubricants in combination is considered, but upper limits should be imposed on the amount of these lubricants to be used in terms of maintenance of the physical properties of vinyl chloride based resin compositions, and even within the proper range of usage amounts, lack of long-term releasability of sheets, the bloom to the surface of a final moldings or deposition of lubricants to the metallic surface of the roll during calender molding is caused, and thus it cannot provide a universal solution.

In recent years, in calender-molding of vinyl chloride resin, enhancement of production speed to reduce molding time together with the scale-up of molders is promoted in order to improve producibility. In association with the enhancement of the speed of calender molding, a large number of ungelled products and flow marks are generated on the sheet molded by calender molding, leading to deterioration of appearance and quality of final moldings, and thus techniques to improve this situation are required. In addition, techniques to further improve releasability of sheets from the metallic surface of the roll are also required.

DISCLOSURE OF THE INVENTION

An object of the present invention is to fulfill the above described requirements. That is, an object of the present invention is to provide, under a high speed calender molding condition of a vinyl chloride based resin, a processing aid for calender molding that reduces generation of ungelled products and flow marks on sheets leading to degradation of commercial values of final moldings, and improves releasability of sheets from the metallic surface of a roll, a vinyl chloride based composition for calender molding using the processing aid.

As a result of making vigorous considerations to solve the above described problems, the inventors have found that a processing aid comprising two types of polymers different in functionality, namely a copolymer (A) and a copolymer (B) is blended in vinyl chloride resin, thereby making it possible to reduce ungelled products and flow marks in calender-molding, and improve the releasability of sheets from the metallic surface of a roll, and thus completed the present invention.

That is, the gists of the present invention are (1) a processing aid comprising:
a copolymer (A) whose mean weight molecular weight (Mw) measured with gel permeation chromatography is in the range of from 700,000 to 2,000,000, and molecular weight distribution (Mw/Mn) is 3.0 or smaller, which is obtained by copolymerizing a monomer mixture comprising 70 to 90% by weight of methyl methacrylate, 10 to 30% by weight of acrylate or methacrylate other than methyl methacrylate and a different type of monomer capable of being copolymerized with those monomers, and a copolymer (B) whose mean weight molecular weight (Mw) measured with gel permeation chromatography is in the range of from 10,000 to 500,000, which is obtained by copolymerizing a monomer mixture comprising at least 30% by weight of methyl methacrylate and a monomer having as constitutional units at least one type selected from methacrylates other than methyl methacrylate, acrylates, aromatic alkenyl compounds and other monomers;

(2) a vinyl chloride based resin composition comprising 100 parts by weight of vinyl chloride based resin and 0.1 to 20 parts by weight of the processing aid described in the above item (1); and (3) a method of producing moldings by calender molding from the vinyl chloride resin composition described in the above item (2).

The processing aid of the present invention is blended in vinyl chloride based resin, thereby making it possible to reduce ungelled products and flow marks on sheets in calender molding and improve the releasability of sheets from the metallic surface of a roll and thus the industrial value of the processing aid is significant.

BEST MODE FOR CARRYING OUT THE INVENTION

The present invention will be described in detail below.

The processing aid of the present invention comprises a copolymer (A) whose mean weight molecular weight (Mw) measured with gel permeation chromatography is in the range of from 700,000 to 2,000,000, and molecular weight distribution (Mw/Mn) is 3.0 or smaller, which is obtained by copolymerizing a monomer mixture comprising 70 to 90% by weight of methyl methacrylate, 10 to 30% by weight of acrylate or methacrylate other than methyl methacryrate and a different type of monomer component capable of being copolymerized with those monomers, and a copolymer (B) whose mean weight molecular weight (Mw) measured with gel permeation chromatography is in the range of from 10,000 to 500,000, which is obtained by copolymerizing a monomer mixture comprising at least 30% by weight of methyl methacrylate and a monomer having as constitutional units at least one type selected from methacrylates other than methyl methacrylate, acrylates, aromatic alkenyl compounds and other monomers.

This processing aid will be described in detail below.

The copolymer (A) constituting the processing aid of the present invention is a copolymer whose mean weight molecular weight (Mw) measured with gel permeation chromatography is in the range of from 700,000 to 2,000,000, and molecular weight distribution (Mw/Mn) is 3.0 or smaller, which is obtained by copolymerizing a monomer mixture comprising 70 to 90% by weight of methyl methacrylate, 10 to 30% by weight of acrylate or methacrylate other than methyl methacryrate and a different type of monomer component capable of being copolymerized with those monomers.

The acrylate has an alkyl group having 1 to 18 carbon atoms, and the alkyl group of the acrylate may be a straight-chain or branched alkyl group, or a cyclic alkyl group. Specifically, those having a straight-chain alkyl group include methyl acrylate, ethyl acrylate, n-butyl acrylate, lauryl acrylate and stearyl acrylate. Also, those having a branched alkyl group include 2-ethylhexyl acrylate. In addition, those having a cyclic alkyl group include cyclohexyl acrylate. If the number of carbon atoms of the alkyl group is larger than 18, the polymerization property of monomers may be degraded, thus making it difficult to carry out copolymerization. In addition, the effect of promoting gelation of vinyl chloride based resin during calender molding may be hindered to cause ungelled products to be generated in the sheet.

The methacrylate other than methyl methacrylate has an alkyl group having 2 to 18 carbon atoms, and the alkyl group of the methacrylate may be a straight-chain or branched alkyl group, or a cyclic alkyl group. Specifically, those having a straight-chain alkyl group include ethyl methacrylate, n-butyl methacrylate, lauryl methacrylate, stearyl methacrylate and tridecyl methacrylate. Also, those having a branched alkyl group include i-butyl methacrylate, t-butyl methacrylate and 2-ethylhexyl methacrylate. In addition, those having a cyclic alkyl group include cyclohexyl methacrylate. If the number of carbon atoms of the alkyl group is larger than 18, the polymerization property of monomers is degraded, thus making it difficult to carry out copolymerization, which is not preferable. In addition, the effect of promoting gelation of vinyl chloride based resin during calender molding may be hindered to cause ungelled products to be generated on the sheet.

For the ratio between the methyl methacrylate component and the acrylate or methacrylate component other than methyl methacrylate in the monomer component constituting the copolymer (A), the content of the methyl methacrylate component is 70 to 90% by weight, preferably 80 to 90% by weight. The content of the acrylate or methacrylate component other than methyl methacrylate is 10 to 30% by weight, preferably 10 to 20% by weight.

If the content of the methyl methacrylate component in the monomer component is higher than 90% by weight, dispersibility of the copolymer (A) in vinyl chloride based resin is degraded during calender molding, and ungelled products may be generated. Also, if the content of the acrylate or methacrylate other than methyl methacrylate is higher than 30% by weight, compatibility with vinyl chloride resin based resin is degraded, and the effect of promoting gelation of vinyl chloride based resin during calender molding may be hindered to cause ungelled products to be generated in the sheet.

In addition, different types of monomers capable of being copolymerized with those monomers include aromatic alkenyl compounds such as styrene, a-methyl styrene, chlorstyrene and vinyl toluene; vinyl cyanide compounds such as acrylonitrile, methacrylonitrile; vinyl esters such as vinyl acetate; dicarboxylic anhydrides such as maleic anhydride; and polyfunctional monomers such as divinyl benzene and aryl methacrylate. In the present invention, they may be used alone, or two or more types may be used in combination, but these monomer components in the monomer component constituting the copolymer (A) are preferably used in the content of 3% by weight or lower, more preferably 2% by weight or lower so as not to deteriorate promotion of gelation of vinyl chloride based resin, which is an essential function of the processing aid of the present invention.

Also, for the mean weight molecular weight (Mw) and molecular weight distribution (Mw/Mn) of the copolymer (A) measured by gel permeation chromatography, it is preferable that the mean weight molecular weight (Mw) is in the range of from 700,000 to 2,000,000, and the molecular weight distribution (Mw/Mn) is 3.0 or smaller, because they have a significant influence on the properties as a processing aid for calender molding.

If the mean weight molecular weight (Mw) of the copolymer (A) is smaller than 700,000, flow marks on the sheet can be alleviated, but air marks are more likely generated during calender molding. Also, if the mean weight molecular weight (Mw) is larger than 2,000,000, melting viscosity is increased during calender molding, and therefore flow marks are more likely generated on the sheet.

If the molecular weight distribution (Mw/Mn) of the copolymer (A) is larger than 3.0, low molecular weight components are increased to raise the possibility of occurrence of exudation, which is not preferable. Allow marks may be influenced in an unfavorable way.

Polymerization methods for obtaining the copolymer (A) include emulsion polymerization, suspension polymerization and solution polymerization, but emulsion polymerization is most preferably applied.

Here, emulsions capable of being used in emulsion polymerization are not particularly limited, and known emulsions maybe used. For example, anionic surfactants such as aliphatic esters, alkyl sulfates, alkylbenzene sulfonates, alkyl phosphate salts and dialkyl sulfosuccinates; nonionic surfactants such as polyoxyethylene alkyl ether, polyoxyethylene aliphatic ester, sorbitan aliphatic ester and glycerin aliphatic ester; and cationic surfactants such as alkylamine esters may be used. These emulsions may be used alone or in combination.

Also, when pH of the polymerization system is on the alkali side depending on types of emulsions that are used, an appropriate pH-regulator to prevent hydrolysis of alkyl methacrylate and alkyl acrylate may be used. As pH-regulators, boric acid-potassium chloride-potassium hydrate, potassium dihydrogen phosphate-disodium hydrogen phosphate, boric acid-potassium chloride-potassium carbonate, citric acid-potassium hydrogen citrate, potassium dihydrogen phosphate-boric acid, disodium hydrogen phosphate-citric acid and the like may be used.

Also, polymerization initiators may be water-soluble or fat-soluble single system initiators or redox system initiators, and as for examples of water-soluble initiators, a usual inorganic initiator such as persulfate may be used alone or in combination with sulfite, bisulfite, thiosulfate and the like as a redox system initiator.

As for examples of oil-soluble initiators, an organic peroxide such as t-butyl hydroperoxide, cumene hydroperoxide, benzoyl peroxide and lauroyl peroxide, an azo compound or the like may be used alone or in combination with sodium formaldehyde sulfoxylate and the like as a redox system initiator, but oil-soluble initiators should not be limited such specific examples.

Also, the mean weight molecular weight (Mw) and molecular weight distribution (Mw/Mn) of the copolymer (A) can be optionally adjusted with chain transfer agents such as n-octylmercaptan and t-dodecylmercaptan, and polymerization conditions.

The copolymer (B) constituting the processing aid of the present invention together with the copolymer (A) is a copolymer whose mean weight molecular weight (Mw) measured with gel permeation chromatography is in the range of from 10,000 to 500,000, which is obtained by copolymerizing a monomer mixture comprising at least 30% by weight of methyl methacrylate and a monomer having as constitutional units at least one type selected from methacrylates other than methyl methacrylate, acrylates, aromatic alkenyl compounds and other monomers, and provides releasability from the metallic surface of the roll to vinyl chloride based resin in calender molding.

The amount of methyl methacrylate to be used is 30 to 55% by weight, preferably 40 to 50% by weight. If the amount of methyl methacrylate to be used is smaller than 30% by weight, promotion of gelation of vinyl chloride based resin may be hindered. In addition, secondary aggregation tends to occur in post processes such as solidification, an hydration and drying, and thus problems maybe caused in terms of productivity. Also, if the amount is larger than 55% by weight, effects of providing releasability to vinyl chloride based resin will be compromised.

The methacrylate other than methyl methacrylate has an alkyl group having 2 to 18 carbon atoms, and the alkyl group of the methacrylate may be a straight-chain or branched alkyl group, or a cyclic alkyl group. Specifically, those having a straight-chain alkyl group include ethyl methacrylate, n-butyl methacrylate, lauryl methacrylate, stearyl methacrylate and tridecyl methacrylate. Also, those having 5 a branched alkyl group include i-butyl methacrylate, t-butyl methacrylate and 2-ethylhexyl methacrylate. In addition, those having a cyclic alkyl group include cyclohexyl methacrylate.

If the number of carbon atoms of the alkyl group is larger than 18, the polymerization property is degraded because the polymerization speed is reduced, and problems may be caused in terms of productivity.

The acrylate has an alkyl group having 1 to 18 carbon atoms, and the alkyl group of the acrylate may be a straight-chain or branched alkyl group, or a cyclic alkyl group. Specifically, those having a straight-chain alkyl group include methyl acrylate, ethyl acrylate, n-butyl acrylate, lauryl acrylate and stearyl acrylate. Also, those having a branched alkyl group include 2-ethylhexyl acrylate. In addition, those having a cyclic alkyl group include cyclohexyl acrylate.

If the number of carbon atoms of the alkyl group is larger than 18, the polymerization property is degraded because the polymerization speed is reduced, and problems may be caused in terms of productivity.

The aromatic alkenyl compounds include styrene, α-methyl styrene, chlorstyrene and vinyl toluene.

Other monomers include vinyl cyanide compounds such as acrylonitrile and methacrylonitrile, vinyl esters such as vinyl acetate, and dicarboxylic anhydrides such as maleic anhydride.

The amount of these monomers to be used is 45 to 70% by weight, preferably 50 to 60% by weight. If the amount of these monomers to be used is smaller than 45% by weight, the effect of providing releasability to vinyl chloride based resin will be compromised. Also, if the amount is larger than 70% by weight, the effect of promoting gelation of vinyl chloride based resin may be hindered during calender molding.

In addition, polyfunctional monomers such as divinyl benzene and aryl methacrylate can also be used, but the amount of these polyfunctional monomers to be used in this case is preferably 2% by weight or smaller.

In addition, the mean weight molecular weight (Mw) of the copolymer (B) for use in the present invention, measured with gel permeation chromatography is preferably in the range of from 10,000 to 500,000.

If the mean weight molecular weight of the copolymer (B) is larger than 500,000, the effect of providing releasability during calender molding is significantly compromised. Also, if it is smaller than 10,000, the effect of providing releasability during calender molding is significantly compromised.

Polymerization methods for obtaining the copolymer (B) of the present invention include emulsion polymerization, suspension polymerization and solution polymerization, but emulsion polymerization is most preferably applied.

Here, emulsions capable of being used in emulsion polymerization are not particularly limited, and known emulsions may be used. For example, anionic surfactants such as aliphatic esters, alkyl sulfates, alkylbenzene sulfonates, alkyl phosphate salts and dialkyl sulfosuccinates; nonionic surfactants such as polyoxyethylene alkyl ether, polyoxyethylene aliphatic ester, sorbitan aliphatic ester and glycerin aliphatic ester; and cationic surfactants such as alkylamine esters may be used. These emulsions may be used alone or in combination.

Also, when pH of the polymerization system is on the alkali side depending on types of emulsions that are used, an appropriate pH-regulator to prevent hydrolysis of alkyl methacrylate and alkylacrylate may be used. As pH-regulators, boric acid-potassium chloride-potassium hydrate, potassium dihydrogen phosphate-disodium hydrogen phosphate, boric acid-potassium chloride-potassium carbonate, citric acid-potassium hydrogen citrate, potassium dihydrogen phosphate-boric acid, disodium hydrogen phosphate-citric acid and the like may be used.

Also, polymerization initiators may be water-soluble or fat-soluble single system initiators or redox system initiators, and as for examples of water-soluble initiators, a usual inorganic initiator such as persulfate may be used alone or in combination with sulfite, bisulfite, thiosulfate and the like as a redox system initiator.

As for examples of oil-soluble initiators, an organic peroxide such as t-butyl hydroperoxide, cumene hydroperoxide, benzoyl peroxide and lauroyl peroxide, an azo compound or the like may be used alone or in combination with sodium formaldehyde sulfoxylate and the like as a redox system initiator, but oil-soluble initiators should not be limited such specific examples.

Also, the mean weight molecular weight of the copolymer (B) can be optionally adjusted with chain transfer agents such as n-octylmercaptan and t-dodecyl mercaptan, and polymerization conditions.

The processing aid of the present invention is a blend of the copolymer (A) and copolymer (B) obtained as described above, and they are blended in the ratio of 100 parts by weight of the copolymer (A) to 0.5 to 100 parts by weight of the copolymer (B). If the amount of the copolymer (B) blended is smaller than 0.5 parts by weight, good releasability of sheets from the roll during calender molding, which is a remarkable feature of the present invention, may not be obtained. Also, if the amount of the copolymer (B) blended is larger than 100 parts by weight, promotion of gelation of vinyl chloride based resin may be hindered. Also, air marks are more likely generated in the sheet during calender molding, and secondary processability may be degraded.

Also, because the mean weight molecular weight (Mw) and molecular distribution (Mw/Mn) of the processing aid for calender molding of the present invention, measured with gel permeation chromatography has a significant influence on the properties as a processing aid, it is preferable that also the mean weight molecular weight of the blend of the copolymer (A) and copolymer (B) measured with gel permeation chromatography is in the range of from 700,000 to 2,000,000 and its molecular weight distribution is 3.0 or smaller as well, and for the aforesaid blending ratio, the mean weight molecular weight and molecular weight distribution of the blend are preferably in the ranges described above.

For implementing the present invention, the copolymer (A) and copolymer (B) are blended by blending each of their latexes in the above described ratio on a solid basis.

For the method of collecting the copolymer (A) and copolymer (B) from the blended latex, for example, they may be collected in powder form by subjecting the latex to acid coagulation or salting out the latex to precipitate the polymer with an electrolyte of acids such as sulfuric acid, hydrochloric acid and phosphoric acid or salts such as aluminum chloride, calcium chloride, magnesium sulfate, aluminum sulfate and calcium acetate, followed by filtering, cleaning and drying if they are to be obtained using emulsion polymerization.

Coagulants for use in acid coagulation or salting out are not limited such specific examples, and known coagulants may be used.

Also, known collection methods such as spray drying or freeze drying may be used.

In addition, there is a method in which the processing aid is obtained by subsequently blending individual powders of the copolymer (A) and copolymer (B), but the above described method in which the processing aid is obtained by blending latexes is particularly preferable.

The processing aid of the present invention may be used for various applications, for example calender molding, (contour) extrusion molding, injection molding and expansion molding, but it is particularly preferably used for calender molding.

Vinyl chloride resins for use in the vinyl chloride based resin composition of the present invention are not particularly limited, and they include, for example, vinyl chloride homo polyvinyl chloride, after-chlorinated polyvinyl chloride, partially crosslinked polyvinyl chloride, or copolymers of vinyl chloride containing no more than 30% by weight of other vinyl compound capable of being copolymerized with vinyl chloride and other vinyl compound, and mixtures thereof.

The above described other vinyl compounds capable of being copolymerized with the vinyl chloride component are not particularly limited, but specific examples thereof include aliphatic vinyl esters such as vinyl acetate and vinyl propionate; alkyl methacrylates such as methyl methacrylate, ethyl methacrylate and butyl methacrylate: alkyl acrylates such as methyl acrylate, ethyl acrylate and butyl acrylate; α-olefin such as ethylene, propylene and styrene; alkyl vinyl ethers such as vinyl methyl ether and vinyl butyl ether; and unsaturated carbonic acids such as acrylic acid, methacrylic acid and maleic anhydride, or anhydrides thereof, and they may be used alone or in combination of two or more types thereof.

If the copolymerized amount of the above described other vinyl compound capable of being copolymerized is larger than 30% by weight, properties specific of vinyl chloride based resin are signlficantly compromised, which is not preferable. In addition, these vinyl chloride based resins may be used alone or in combination of two or more types thereof.

For vinyl chloride based resin for use in the vinyl chloride based resin composition of the present invention, its mean degree of polymerization is preferably in the range of from 300 to 5,000, more preferably in the range of from 500 to 3,000. For vinyl chloride based resin of which mean degree of polymerization is lower than 300, calender-molded products may have insufficient strength. Also, if the mean degree of polymerization is larger than 5,000, it is difficult to knead resin sufficiently during calender molding, and thus processability may be compromised.

For vinyl chloride based resin for use in the vinyl chloride based resin composition of the present invention, methods for producing the vinyl chloride based resin are not particularly limited, and various known techniques such as emulsion polymerization, suspension polymerization and bulk polymerization may be used.

The vinyl chloride based resin composition of the present invention has preferably 0.1 to 20 parts by weight, more preferably 0.2 to 10 parts by weight of processing aid blended relative to 100 parts by weight of the above described vinyl chloride resin. If the blending ratio of the processing aid is lower than 0.1 parts by weight, air marks may be generated on the sheet during calender molding, and releasability of the sheet from the metallic surf ace of the roll may also be degraded. Also, if the blending ratio is larger than 20 parts by weight, the releasability of the sheet from the metallic surface of the roll is improved, but effects of alleviating flow marks may be significantly compromised.

Methods of blending and adding the processing aid in vinyl chloride based resin are not particularly limited, and known kneading and blending methods may usually be used, and for example, a predetermined amount of vinyl chloride resin and processing aid are blended using a Henschel mixer, Banbury mixer, ribbon blender, V-type mixer or the like, and the resulting product is processed by a kneader such as a single spindle extruder, double spindle extruder, pressing kneader or mixing roll, whereby the vinyl chloride based resin composition of the invention can be obtained. Also, the vinyl chloride based resin composition may be used in either powder or pellet form.

In the case where the vinyl chloride based resin and processing aid are blended to obtain the vinyl chloride based resin of the present invention, various kinds of additives such as a known heat stabilizer, lubricant, processing aid, impact modifier, plasticizer, heat-proof improver, bulking agent, blowing agent, pigment, ultraviolet stabilizer, antifogging agent, anti-fungus agent, antistatic agent, surfactant and flame retardant may be used in combination depending on the purpose, as long as the effect of the invention is not compromised.

Heat stabilizers include, for example, lead heat stabilizers such as tribasic lead sulphate, dibasic lead phosphate, basic lead sulfite, and lead silicate; metallic soap based stabilizers derived from a metal such as potassium, magnesium, barium, zinc, cadmium and lead, and fatty acid such as 2-ethyl hexanoic acid, lauric acid, myristic acid, palmitic acid, stearic acid, isostearic acid, hydroxystearic acid, oleic acid, ricinoleic acid, linoleic acid and behenic acid; organotin based stabilizers derived from an alkyl group, ester group and apliphatic ester, maleate and sulfide compound; composite metal soap based stabilizers such as a Ba—Zn system, Ca—Zn system, Ba—Ca system, Ca—Mg—Sn system, Ca—Zn—Sn system, Pb—Sn systemand Pb—Ba—Ca system; metal salt based stabilizers derived from a metal such as barium and zinc, and usually two or more types of organic acids such as branched fatty acids such as 2-ethyl hexanoic acid, isodecanoic acid and trialkyl acetic acid, unsaturated fatty acids such as oleic acid, ricinoleic acid and linoleic acid, cyclic fatty acids such as naphthenic acid, aromatic acids such as carbolic acid, benzoic acid, salicylic acid and substituted derivatives thereof; metal based stabilizers such as metal salt liquid stabilizers obtained by dissolving the above stabilizers in an organic solvent such as petroleum hydrocarbon, alcohol and glycerin derivatives and blending therein stabilizing aids such as a phosphite, epoxy compound, anti-color agent, transparency improver, light stabilizer, antioxidant and lubricant; epoxy compounds such as epoxy resin, epoxidized soybean oil, epoxidized vegetable oil and epoxidized aliphatic alkyl ester; nonmetal stabilizers such as organic phosphites of which phosphorous is substituted with a alkyl group, aryl group, cycloalkyl group, alkoxyl group or the like, and which have dihydric alcohol such as propylene glycol and aromatic compounds such as hydrochinone and bisphenol A, and they may be used alone or in combination of two or more types thereof.

Lubricants may include, for example, pure hydrocarbon based lubricants such as liquid paraffin, natural paraffin, micro wax and synthetic paraffin and low molecular weight polyethylene; halogenated hydrocarbon based lubricants; fatty acid based lubricants such as higher fatty acids and oxyfatty acids; amide based lubricants such as fatty amide and bisfatty amide; ester based lubricants such as lower alcohol esters of fatty acid, polyalcohol esters of fatty acid such as glyceride, polyglycol esters of fatty acid and fatty alcohol esters of fatty acid (ester wax); and metal soap, fatty alcohol, polyalcohol, polyglycol, polyglycerol, partial esters of fatty acid and polyalcohol, and partial esters of fatty acid and polyglycol or polyglycerol.

In addition, plasticizers include, for example, phthalate based plasticizers such as dimethyl phthalate, diethyl phthalate, dibutyl phthalate, dihexyl phthalate, dinormaloctyl phthalate, 2-ethylhexyl phthalate, diisooctyl phthalate, dicapryl phthalate, dinonyl phthalate, diisononyl phthalate, didecyl phthalate, diisodecyl phthalate, diundecyl phthalate, dilauryl phthalate, ditridecyl phthalate, dibenzyl phthalate, dicyclohexyl phthalate, butylbenzyl phthalate, octyldecyl phthalate, butyloctyl phthalate, octylbenzyl phthalate, normalhexyl normaldecyl phthalate and normaloctyl normaldecyl phthalate; phosphate based plasticizers such as tricresyl phosphate, tri-2-ethylhexyl phosphate, triphenyl phosphate, 2-ethylhexyldiphenyl phosphate and cresildiphenyl phosphate; adipate based plasticizers such as di-2-ethylhexyl adipate, diisodecyl adipate, normaloctyl-normaldecyl adipate, normalheptyl-normalnonyl adipate, diisooctyl adipate, diisonormaloctyl adipate, dinormaloctyl adipate and didecyl adipate; sebacate based plasticizers such as dibutyl sebacate, di-2-ethylhexyl sebacate, diisooctyl sebacate and butylbenzyl sebacate; azelate based plasticizers such as di-2-ethylhexyl azelate, dihexyl azelate and diisooctyl azelate; citrate based plasticizers such as triethyl citrate, triethyl acetyl citrate, tributyl citrate, tributyl acetyl citrate and tri-2-ethylhexyl acetyl citrate, glycolate based plasticizers such as metylphthalylethyl glycolate, ethylphthalylethyl glycolate and butylphthalylbutyl glycolate; trimellitate based plasticizers such as tributyl trimellitate, tri-normalhexyl trimellitate, tri-2-ethylhexyl trimellitate, tri-normaloctyl trimellitate, tri-isocutiltrimellitate and tri-isodecyl trimellitate; isomeric phthalate based plasticizers such as di-2-ethylhexyl isophthalate and di-2-ethylhexyl terephthalate; ricinoleate based plasticizers such as methylacetyl ricinoleate and butylacetyl ricinoleate; polyester based plasticizers such as polypropylene adipate, polypropylene sebacate, and modified polyesters thereof; and epoxy based plasticizers such as epoxidized soybean oil, epoxybutyl stearate, epoxy (2-ethylhexyl) stearate, epoxidized linseed oil and 2-ethylhexylepoxy citrate, and they may be used alone or in combination of two or more types thereof.

Impact modifiers may include polybutadiene, polyisoprene, polychloropurene, fluoro rubber, styrene-butadiene copolymer rubber, methyl methacrylate-butadiene-styrene based copolymers, methyl methacrylate-butadiene-styrene based graft copolymers, acrylonitrile-styrene-butadiene based copolymer rubber, acrylonitrile-styrene-butadiene based graft copolymers, styrene-butadiene-styrene block copolymer rubber, styrene-isoprene-styrene copolymer rubber, styrene-ethylene-butylene-styrene copolymer rubber, ethylene-propylene copolymer rubber, ethylene-propylene-diene copolymer rubber (EPDM), silicone containing acryl based rubber, silicone/acryl composite rubber based graft copolymers, and silicone based rubber.

For the diene of the ethylene-propylene-diene copolymer rubber (EPDM), 1,4-hexanediene, dicyclopentadiene, methylene norbornene, ethylidene norbornene, propenyl norbornene and the like are used. These impact modifiers may be used alone or in combination of two or more types thereof.

For bulking agents, for example, carbonates such as heavy calcium carbonate, precipitated calcium carbonate and colloid calcium carbonate, minerals such as aluminum hydroxide, magnesium hydroxide, titanium oxide, clay, mica, talc, wollastonite, zeolite, silica, zinc oxide, magnesium oxide, carbon black, graphite, glass beads, glass fibers, carbon fibers and metal fibers, and organic fibers such as polyamide may be used, and they may be used alone or in combination of two or more types thereof. In addition, a flame retardant such as chlorinated paraffin, aluminum hydroxide, antimony trioxide and a halogen compound, a fluidity improver, a colorant, an antistatic agent, a surfactant, an anti-fogging agent, and an anti-fungus agent may optionally be blended depending on the purpose, as long as the effect of the vinyl chloride based resin composition of the present invention is not compromised.

Substances that can be blended together with the vinyl chloride based resin composition of the present invention have been described above, the invention is not limited such specific example.

The vinyl chloride based resin composition can usually be applied to known molding methods, for example calender molding, extrusion molding and injection molding to obtain various kinds of moldings, but the effect of the invention is most enhanced in calender molding.

The present invention will be described further specifically below using Examples, but the invention should not be limited such Examples. Furthermore, "part" and "%" described in each Example and Comparative Example mean "part by weight" and "% by weight", respectively.

In order to demonstrate the outstanding effect of the vinyl chloride based resin composition of the present invention, tests were carried out for evaluating roll releasability, flow marks, air marks, gelation properties and ungelled products.

EXAMPLE 1

Air in a reaction vessel provided with a stirrer and a reflux cooler was replaced with nitrogen, followed by placing therein a mixture of 230 parts of ion-exchanged water, 1.0 parts of sodium dioctylsulfo succinate, 0. 15 parts of potassium persulfate, 85 parts of methyl methacrylate, 15 parts of n-butyl acrylate and 0.0175 parts of n-octylmercaptan, and then the air in the vessel was replaced with nitrogen again, followed by heating the reaction vessel to 65° C. under stirring, heating and stirring for two hours, completing the polymerization reaction and cooling to obtain a latex of copolymer (A). A part of the obtained latex was added in an aluminum chloride solution to salt out and coagulate the same, followed by washing and drying to obtain a polymer of copolymer (A). 0.05 g of the obtained polymer of copolymer (A) was dissolved in 10 ml of chloroform to measure the mean weight molecular weight (Mw) and the molecular weight distribution (Mw/Mn) using a column (K-806L manufactured by Showa Denko K.K.) in gel permeation chromatography (LC-10A System manufactured by Shimadzu Corp.), and the mean weight molecular weight (Mw) was 1,100,000 and the molecular weight distribution (Mw/Mn) was 2.0.

Air in a reaction vessel provided with a stirrer and a reflux cooler was replaced with nitrogen, followed by placing therein a mixture of 260 parts of ion-exchanged water, 1.5 parts of sodium dioctylsulfo succinate, 0.2 parts of potassium persulfate, 30 parts of methyl methacrylate and 0.03 parts of n-octylmercaptan, and then the air in the vessel was replaced with nitrogen again, followed by heating the reaction vessel to 65° C. under stirring, and heating and stirring for two hours. Subsequently, a mixture of 20 parts of n-butyl methacrylate, 30 parts of n-butyl acrylate and 0.5 parts of n-octylmercaptan was added therein for one hour, and was stirred for two hours after the mixture was added. Thereafter, a mixture of 20 parts of methyl methacrylate and 0. 05 parts of n-octylmercaptan was added in this reaction system for thirty minutes, and was stirred for two hours, followed by completing the polymerization reaction and cooling to obtain a latex of copolymer (B).

A part of the obtained latex was added in an aluminum chloride solution to salt out and coagulate the same, followed by washing and drying to obtain a polymer of copolymer (B). The mean weight molecular weight (Mw) of the obtained copolymer (B) was 220,000.

Then, as a solid matter, 100 parts of latex of copolymer (A) were placed in a reaction vessel provided with a stirrer, and was stirred. 10 parts of latex of copolymer (B) were added therein as a solid matter in ten seconds, followed by stirring for twenty minutes. The obtained latex mixture was added in an aluminum chloride solution to salt out and coagulate the same, followed by washing, dehydrating and drying to obtain a powdered copolymer mixture. The mean weight molecular weight (Mw) of the copolymer mixture was 1,040,000, and its molecular weight distribution (Mw/Mn) was 2.4.

This copolymer mixture was subjected to the following valuation tests.

(1) Evaluation of roll releasability: A 6 inch roll (manufactured by Kansai Roll Co., Ltd.) was used to knead the mixture, with the kneading temperature being 200° C., the roll interval being 0.25 mm and the amount of sample being 100 g, and time until it became difficult to release the sheet was measured. It was considered that the longer the time, the better was the releasability of the sheet from the metallic surface of the roll.

The following blending was used for the resin composition that was used for the evaluation of roll releasability.

100 parts of vinyl chloride homopolymer with mean degree of polymerization of 800 (TK-800 manufactured by Shin-Etsu Chemical Co., Ltd.) was blended with 1.7 parts of dibutyl tin mercaptide (T-17MJ manufactured by Katsuta Chemical Industry Co., Ltd.), 1.0 parts of polyalcohol aliphatic ester (LoxiolG-16 manufactured by Henkel Japan Co., Ltd.), 6.0 parts of MetabrenC-201A (manufactured by Mitsubishi Rayon Co., Ltd.) and the copolymer mixture obtained in Examples or Comparative Examples, and was blended using a Henschel mixer until the inside temperature reached 120° C., followed by cooling to the room temperature to obtain a vinyl chloride based resin composition.

(2) Evaluation of flow marks: The mixture was kneaded for three minutes using a 6 inch roll (manufactured by Kansai Roll Co., Ltd.), with the kneading temperature being 200° C., the roll interval being 0.25 mm and the amount of sample being 100 g, to prepare sheets with thickness of 0.5 mm, and the amount of flow marks on the sheet was determined by visual observations and evaluations were made in such a manner that the results were marked with ○, Δ and x in descending order of satisfactoriness. Here, ○ means little flow marks, Δ means that flow marks are so noticeable that problems may be caused from a practical viewpoint, and x means that a large amount of flow marks are generated and they are too prominent not to be used practically.

These evaluations were made using the same vinyl chloride based resin composition as th at used in the evaluation of roll releasability.

(3) Evaluation of air marks: The mixture was kneaded for three minutes using a 6 inch roll (manufactured by Kansai Roll Co., Ltd.), with the kneading temperature being 200° C., the roll interval being 0.25 mm and the amount of sample being 100 g, to prepare sheets with thickness of 2 mm, and the size and amount of air marks on the sheet were determined by visual observations, and evaluations were made in such a manner that the results were marked with ○, Δ and x in descending order of satisfactoriness. Here, ○ means little air marks, Δ means that air marks are so noticeable that problems may be caused from a practical viewpoint, and x means that a large amount of air marks are generated and they are too prominent not to be used practically.

These evaluations were made using the same vinyl chloride based resin composition as that used in the evaluation of roll releasability.

(4) Evaluation of gelation properties: The maximum torque and time until the maximum torque was reached (gelation time) when the mixture was kneaded using Lab Plastomill (manufactured by Toyo Seiki Co., Ltd.), with the temperature being 160° C., the number of revolutions being 30 rpm and the loading weight being 53 g, were measured. It was considered that the shorter this gelation time, the higher is the gelation speed.

The following blending was used for the resin composition that was used for the evaluation of gelation properties.

100 parts of vinyl chloride homopolymer with mean degree of polymerization of 800 (TK-800 manufactured by Shin-Etsu Chemical Co., Ltd.) was blended with 1.1 parts of dibutyl tin mercaptide (T-17MJ manufactured by Katsuta Chemical Industry Co., Ltd.), 0.8 parts of polyalcohol aliphatic ester (LoxiolG-16manufactured by Henkel Japan Co.,Ltd.), 0.15parts of polymer ester (LoxiolG-70S manufactured by Henkel Japan Co., Ltd.), 6.0 parts of Metabren C-201A (manufactured by Mitsubishi Rayon Co., Ltd.) and the copolymer mixture obtained in Examples or Comparative Examples, and was blended using a Henschel mixer until the inside temperature reached 120° C., followed by cooling to the room temperature to obtain a vinyl chloride based resin composition.

(5) Ungelled products: Using a 20 mm single spindle extruder provided with a T-die, films with thickness of 0.1 mm were extruded, with the number of revolutions of the screw being 40 rpm and the cylinder temperature being 180° C., and the number of ungelled products in a fixed area on the film surface was determined by visual observations, and evaluations were made in such a manner that the results were marked with ○, Δ and x in descending order of satisfactoriness. Here, ○ means that the result is very good, A means that ungelled products are so noticeable that problems may be caused from a practical viewpoint, and x means that the number of ungelled products is too large not to be used practically.

The following blending was used for the resin composition that was used for the evaluation of ungelled products.

A vinyl chloride homopolymer with mean degree of polymerization of 700 (TK-700 manufactured by Shin-Etsu Chemical Co., Ltd.) was blended with 2.0 parts of dibutyl tin mercaptide (T-17MJ manufactured by Katsuta Chemical Industry Co., Ltd.), 0.9 parts of polyalcohol aliphatic ester (LoxiolG-16 manufactured by Henkel Japan Co. Ltd.), 0.6 parts of polymer ester (LoxiolG-72 manufactured by Henkel Japan Co., Ltd.), 5.0parts of Metabren C-201A (manufactured by Mitsubishi Rayon Co., Ltd.) and the copolymer mixture obtained in Examples or Comparative Examples, and was blended using a Henschel mixer until the inside temperature reached 120° C. followed by cooling to the room temperature to obtain a vinyl chloride based resin composition.

EXAMPLE 2

Air in a reaction vessel provided with a stirrer and a reflux cooler was replaced with nitrogen, followed by placing therein a mixture of 150 parts of ion-exchanged water, 1.0 parts of sodium dioctylsulfo succinate, 0.15 parts of potassium persulfate, 80 parts of methyl methacrylate. 4 parts of n-butyl acrylate and 0.018 parts of n-octylmercaptan, and then the air in the vessel was replaced with nitrogen again, followed by heating the reaction vessel to 65° C. under stirring, and heating and stirring for 2.5 hours, followed by adding 10 parts of methyl methacrylate and 6 parts of n-butyl acrylate in the reaction vessel over five minutes, and heating and stirring for three hours after they were added, followed by completing the polymerization reaction and cooling to obtain a latex of copolymer (A). Subsequently, a dried product of copolymer (A) was obtained for a part of the obtained latex in the same manner as Example 1.

The mean weight molecular weight of the obtained copolymer (A) was 1,120,000 and the molecular weight distribution was 2.3.

Air in a reaction vessel provided with a stirrer and a ref lux cooler was replaced with nitrogen, followed by placing therein a mixture of 150 parts of ion-exchanged water, 1.5 parts of sodium dioctylsulfo succinate, 0.2 parts of potassium persulfate and 30 parts of methyl methacrylate, and then the air in the vessel was replaced with nitrogen again, followed by heating the reaction vessel to 65° C. under stirring, and heating and stirring for three hours.

Subsequently, a mixture of 33 parts of styrene, 22 parts of n-butyl acrylate and 0.5 parts of n-octylmercaptan was added therein for ninety minutes, and was heated and stirred for two hours after the mixture was added. Thereafter, 15 parts of methyl methacrylate were added in this reaction system for thirty minutes, and were heated and stirred for 1.5 hours after they were added, followed by completing the polymerization reaction and cooling to obtain a latex of copolymer (B). Subsequently, a dried product of copolymer (B) was obtained for a part of the obtained latex in the same manner as Example 1.

The mean weight molecular weight (Mw) of the obtained copolymer (B) was 400,000.

Latex blending of the copolymer (A) and (B) was carried out in the same manner as Example 1. Subsequently, the obtained latex mixture was processed in the same manner as Example 1 to obtain a powdered copolymer. The mean weight molecular weight (Mw) of the obtained copolymer was 1,100,000 the molecular weight distribution (Mw/Mn) was 2.8.

EXAMPLE 3

Air in a reaction vessel provided with a stirrer and a reflux cooler was replaced with nitrogen, followed by placing therein a mixture of 150 parts of ion-exchanged water, 1.5 parts of sodium dioctylsulfo succinate, 0.2 parts of potassium persulfate, 70 parts of methyl methacrylate, 4 parts of n-butyl acrylate and 0.025 parts of n-octylmercaptan, and then the air in the vessel was replaced with nitrogen, followed by heating the reaction vessel to 65° C. under stirring, and heating and stirring for 2.5 hours, followed by adding a mixture of 8 parts of methyl methacrylate, 8 parts of n-butyl acrylate and 0.5 parts of n-octylmercaptan in the reaction vessel for fifteen minutes, and heating and stirring for 1.5 hours after it was added. Subsequently, 10 parts of methyl methacrylate were added for ten minutes, and were heated and stirred for two hours after they were added, and then the polymerization reaction was completed, followed by cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 730,000 and the molecular weight distribution was 2.7.

Air in a reaction vessel provided with a stirrer and a reflux cooler was replaced with nitrogen, followed by placing therein a mixture of 150 parts of ion-exchanged water, 1.5 parts of sodium dioctylsulfo succinate, 0.3 parts of potassium persulfate, 10 parts of methyl methacrylate and 0.1 parts of n-octylmercaptan, and then the air in the vessel was replaced with nitrogen again, followed by heating the reaction vessel to 65° C. under stirring, and heating and stirring for 1.5 hours. Subsequently, a mixture of 36 parts of styrene, 24 parts of n-butyl acrylate and 1.0 parts of n-octylmercaptan was added therein for ninety minutes, and was heated and stirred for two hours after the mixture was added. Thereafter, 30 parts of methyl methacrylate and 0.1 parts of n-octylmercaptan were added in this reaction system for 45 minutes, and were heated and stirred for two hours after they were added, followed by completing the polymerization reaction and cooling to obtain a latex of copolymer (B). Subsequently, a dried product of copolymer (B) was obtained for a part of the obtained latex in the same manner as Example 1.

The mean weight molecular weight (Mw) of the obtained copolymer (B) was 70,000.

Latex blending of the copolymer (A) and (B) was carried out in the same manner as Example1. Subsequently,the obtained latex mixture was processed in the same manner as Example 1 to obtain a powdered copolymer mixture. The mean weight molecular weight (Mw) of the obtained copolymer was 700,000 the molecular weight distribution (Mw/Mn) was 2.9.

EXAMPLE 4

Air in a reaction vessel provided with a stirrer and a reflux cooler was replaced with nitrogen, followed by placing therein a mixture of 150 parts of ion-exchanged water, 1.5 parts of sodium dioctylsulfo succinate, 0.15 parts of potassium persulfate, 40 parts of methyl methacrylate, 6 parts of n-butyl acrylate and 0.0035 parts of n-octylmercaptan, and then the air in the vessel was replaced with nitrogen again, followed by heating the reaction vessel to 65° C. under stirring, and heating and stirring for two hours, followed by adding a mixture of 40 parts of methyl methacrylate and 14 parts of n-butyl acrylate in the reaction vessel for sixty minutes, and heating and stirring for three hours after it was added, followed by completing the polymerization reaction, and cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 1,600,000 and the molecular weight distribution was 2.8.

Air in a reaction vessel provided with a stirrer and a reflux cooler was replaced with nitrogen, followed by placing therein a mixture of 150 parts of ion-exchanged water, 1.2 parts of sodium dioctylsulfo succinate, 0.15 parts of potassium persulfate, 40 parts of styrene, 30 parts of n-butyl acrylate and 0.9 parts of n-octylmercaptan, and then the air in the vessel was replaced with nitrogen again, followed by heating the reaction vessel to 65° C. under stirring, and heating and stirring for two hours, followed by adding a mixture of 30 parts of methyl methacrylate and 0.03 parts of n-octylmercaptan in the reaction vessel for 35 minutes, and heating and stirring for three hours after it was added, followed by completing the polymerization reaction, and cooling to obtain a latex of copolymer (B). Subsequently, a dried product of copolymer (B) was obtained for a part of the obtained latex in the same manner as Example 1.

The mean weight molecular weight of the obtained copolymer (B) was 90,000.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (MW) of the obtained copolymer was 1.480,000 the molecular weight distribution (Mw/Mn) was 2.8.

EXAMPLE 5

Air in a reaction vessel provided with a stirrer and a reflux cooler was replaced with nitrogen, followed by placing therein a mixture of 230 parts of ion-exchanged water, 1.0 parts of sodium dioctylsulfo succinate, 0.15 parts of potassium persulfate, 80 parts of methyl methacrylate, 18 parts of n-butyl acrylate, 2 parts of styrene and 0.0185 parts of n-octylmercaptan, and then the air in the vessel was replaced with nitrogen again, followed by heating the reaction vessel to 65° C. under stirring, and heating and stirring for two hours. followed by completing the polymerization reaction, and cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 900,000 and the molecular weight distribution (Mw/Mn) was 2.1.

Air in a reaction vessel provided with a stirrer and a reflux cooler was replaced with nitrogen, followed by placing therein a mixture of 260 parts of ion-exchanged water, 1.5 parts of sodium dioctylsulfo succinate, 0.2 parts of potassium persulfate, 30 parts of methyl methacrylate and 0.03 parts of n-octylmercaptan, and then the air in the vessel was replaced with nitrogen again, followed by heating the reaction vessel to 65° C. under stirring, and heating and stirring for two hours. Subsequently, a mixture of 20 parts of styrene, 30 parts of n-butyl acrylate and 0.5 parts of n-octylmercaptan was added therein for one hour, and was stirred for two hours after the mixture was added. Thereafter, a mixture of 20 parts of methyl methacrylate and 0.05 parts of n-octylmercaptan was added in this reaction system for thirty minutes, and was heated and stirred for two hours, followed by completing the polymerization reaction and cooling to obtain a latex of copolymer (B). Subsequently, a dried product of copolymer (B) was obtained for a part of the obtained latex in the same manner as Example 1.

The mean weight molecular weight (Mw) of the obtained copolymer (B) was 190.000.

Latex blending of the copolymer (A) and (B) was carried out in the same manner as Example 1. Subsequently the obtained latex mixture was processed in the same manner as Example 1 to obtain a powdered copolymer mixture. The mean weight molecular weight (Mw) of the obtained copolymer was 830,000 the molecular weight distribution (Mw/Mn) was 2.8.

Comparative Example 1

Evaluations of molding were made without adding the copolymer mixture to the vinyl chloride based resin composition.

Comparative Example 2

For the copolymer (A), a latex was prepared in the same manner as Example 1 except that n-octylmercaptan in Example 1 was not used. Subsequently, a dried product of copolymer (A) was obtained for a part of the obtained latex in the same manner as Example 1.

The mean weight molecular weight of the obtained copolymer (A) was 3,000,000 and the molecular weight distribution was 3.7.

For the copolymer (B), a latex was prepared in the same manner as Example 1.

Latex blending of the copolymer (A) and (B) was carried out in the same manner as Example 1. Subsequently,the obtained latex mixture was processed in the same manner as Example 1 to obtain a powdered copolymer mixture. The mean weight molecular weight (Mw) of the obtained copolymer was 2,910,000 the molecular weight distribution (Mw/Mn) was 3.4.

Comparative Example 3

Air in a reaction vessel provided with a stirrer and a reflux cooler was replaced with nitrogen, followed by placing therein a mixture of 150 parts of ion-exchanged water, 1.5 parts of sodium dioctylsulfo succinate, 0.2 parts of potassium persulfate, 85 parts of methyl methacrylate and 0.025 parts of n-octylmercaptan, and then the air in the vessel was replaced with nitrogen, followed by heating the reaction vessel to 65° C. under stirring, and heating and stirring for three hours, followed by adding a mixture of 2.5 parts of methyl methacrylate, 2.5 parts of n-butyl acrylate and 0.5 parts of n-octylmercaptan in the reaction vessel for fifteen minutes, and heating and stirring for 1.5 hours after it was added. Subsequently, 10 parts of methyl methacrylate were added for ten minutes, and were heated and stirred for two hours after they were added, followed by completing the polymerization reaction and cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 790,000 and the molecular weight distribution was 2.7.

For the copolymer (B), a latex was prepared in the same manner as Example 1.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (Mw) of the obtained copolymer was 760,000 the molecular weight distribution (Mw/Mn) was 2.9.

Comparative Example 4

Air in a reaction vessel provided with a stirrer and a reflux cooler was replaced with nitrogen, followed by placing therein a mixture of 150 parts of ion-exchanged water, 1.5 parts of sodium dioctylsulfo succinate, 0.2 parts of potassium persulfate, 50 parts of methyl methacrylate, 30 parts of n-butyl acrylate and 0.009 parts of n-octylmercaptan, and then the air in the vessel was replaced with nitrogen, followed by heating the reaction vessel to 65° C. under stirring, and heating and stirring for three hours, followed by adding a mixture of 20 parts of methyl methacrylate and 0.06 parts of n-octylmercaptan in the reaction vessel for thirty minutes, and heating and stirring for two hours after it was added, followed by completing the polymerization reaction, and cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 270, 000and the molecular weight distribution was 2.6.

For the copolymer (B), a latex was prepared in the same manner as Example 1.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (Mw) of the obtained copolymer was 220,000 the molecular weight distribution (Mw/Mn) was 2.8.

Comparative Example 5

A latex was prepared in the same manner as Example 1 except that the amounts of methyl methacrylate and n-butyl acrylate were changed to 80 parts and 20 parts, respectively. Subsequently, a dried product of copolymer (A) was obtained for a part of the obtained latex in the same manner as Example 1.

The mean weight molecular weight of the obtained copolymer (A) was 1,060,000 and the molecular weight distribution (Mw/Mn) was 2.3.

A latex was prepared in the same manner as Example 2 except that n-octylmercaptan of the copolymer (B) in Example 2 was changed to 0.05 parts. Subsequently a dried product of copolymer (B) was obtained for a part of the obtained latex in the same manner as Example 1.

The mean weight molecular weight (Mw) of the obtained copolymer (B) was 810,000.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (Mw) of the obtained copolymer was 220,000 the molecular weight distribution (Mw/Mn) was 2.5.

Comparative Example 6

Latexes of copolymer (A) and copolymer (B) were prepared in the same manner as Example 1.

Latex blending of the copolymer (A) and (B) was carried out in the same manner as Example 1 except that 200 parts of copolymer (B) were used for latex blending as a solid matter. Subsequently, the obtained latex mixture was processed in the same manner as Example 1 to obtain a powdered copolymer mixture. The mean weight molecular weight (Mw) of the obtained copolymer was 740,000 the molecular weight distribution (Mw/Mn) was 3.8.

Comparative Example 7

A latex of copolymer (A) was prepared in the manner as Example 1. Latex blending of copolymer (A) and copolymer (B) was not carried out.

Comparative Example 8

A latex of copolymer (A) was prepared in the same manner as Example 1.

Air in a reaction vessel provided with a stirrer and a reflux cooler was replaced with nitrogen, followed by placing therein a mixture of 150 parts of ion-exchanged water, 1.0 parts of sodium dioctylsulfo succinate, 0.15 parts of potassium persulfate, 20 parts of styrene, 60 parts of n-butyl acrylate and 0.09 parts of n-octylmercaptan, and then the air in the vessel was replaced with nitrogen again, followed by heating the reaction vessel to 65° C. under stirring, and heating and stirring for two hours, followed by adding 20 parts of methyl methacrylate in the reaction vessel for thirty minutes and heating and stirring for three hours after they were added, followed by completing the polymerization reaction, and cooling to obtain a latex of copolymer (B). Subsequently, a dried product of copolymer (B) was obtained for a part of the obtained latex in the same manner as Example 1.

The mean weight molecular weight of the obtained copolymer (B) was 230,000.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (Mw) of the obtained copolymer was 1,060,000 the molecular weight distribution (Mw/Mn) was 2.4.

Comparative Example 9

Air in a reaction vessel provided with a stirrer and a reflux cooler was replaced with nitrogen, followed by placing therein a mixture of 150 parts of ion-exchanged water, 1.5 parts of sodium dioctylsulfo succinate 0.15 parts of potassium persulfate, 40 parts of methyl methacrylate, 6 parts of n-butyl acrylate and 0.0035 parts of n-octylmercaptan, and then the air in the vessel was replaced with nitrogen again, followed by heating the reaction vessel to 65° C. under stirring, and heating and stirring for two hours, followed by adding a mixture of 40 parts of methyl methacrylate and 14 parts of n-butyl acrylate in the reaction vessel for thirty minutes, and heating and stirring for three hours after it was added, followed by completing the polymerization reaction, and cooling to obtain a latex of copolymer (A). Subsequently, a dried product of copolymer (A) was obtained for a part of the obtained latex in the same manner as Example 1.

The mean weight molecular weight (Mw) of the obtained copolymer (A) was 1,750,000 and the molecular weight distribution was 3.6.

A latex of copolymer (B) was prepared in the same manner as Example 1.

Latex blending of the copolymer (A) and (B) was carried out in the same manner as Example 1. Subsequently, the obtained latex mixture was processed in the same manner as Example 1 to obtain a powdered copolymer mixture. The mean weight molecular weight (Mw) of the obtained copolymer was 1,720,000 the molecular weight distribution (Mw/Mn) was 3.4.

Comparative Example 10

Latexes of copolymer (A) and (B) were prepared in the same manner as Example 1, and latex blending was carried out in the same manner as Example 1. Subsequently, the obtained latex mixture was processed in the same manner as Example 1 to obtain a powdered copolymer mixture. 0.1 parts of the obtained copolymer mixture were added and blended in the vinyl chloride based resin composition.

Comparative Example 11

Latexes of copolymer (A) and (B) were prepared in the same manner as Example 1, and latex blending was carried out in the same manner as Example 1. Subsequently, the obtained latex mixture was processed in the same manner as Example 1 to obtain a powdered copolymer mixture. 30 parts of the obtained copolymer mixture were added and blended in the vinyl chloride based resin composition.

TABLE 1

| | Composition of copolymer mixture | | Amount of added copolymer mixture in vinyl chloride based resin composition (parts) | Roll Releasability (minutes) | Flow marks | Air marks | Gelation time (minutes) | Ungelled products |
|---|---|---|---|---|---|---|---|---|
| | Copolymer (A) (parts) | Copolymer (B) (parts) | | | | | | |
| Example 1 | 100 | 10 | 3 | 15.5 | ○ | ○ | 1.3 | ○ |
| Example 2 | 100 | 10 | 3 | 14.0 | ○ | ○ | 1.3 | ○ |
| Example 3 | 100 | 10 | 3 | 14.5 | ○ | ○ | 1.2 | ○ |
| Example 4 | 100 | 10 | 3 | 14.0 | ○ | ○ | 1.0 | ○ |
| Example 5 | 100 | 10 | 3 | 15.0 | ○ | ○ | 1.0 | ○ |
| Comparative Example 1 | — | — | — | 2.5 | ○ | x | 2.5 | x |
| Comparative Example 2 | 100 | 10 | 3 | 14.5 | x | ○ | 1.2 | ○ |
| Comparative Example 3 | 100 | 10 | 3 | 13.0 | ○ | ○ | 1.7 | x |
| Comparative Example 4 | 100 | 10 | 3 | 14.0 | ○ | x | 1.4 | Δ |
| Comparative Example 5 | 100 | 10 | 3 | 9.5 | Δ | ○ | 1.3 | ○ |
| Comparative Example 6 | 100 | 200 | 3 | Over 30.0 | ○ | x | 8.5 | x |
| Comparative Example 7 | 100 | — | 3 | 3.5 | ○ | ○ | 1.3 | ○ |
| Comparative Example 8 | 100 | 10 | 3 | 12.5 | ○ | x | 5.2 | Δ |
| Comparative Example 9 | 100 | 10 | 3 | 13.5 | x | ○ | 1.5 | ○ |
| Comparative Example 10 | 100 | 10 | 0.1 | 3.0 | ○ | ○ | 2.0 | x |
| Comparative Example 11 | 100 | 10 | 30 | 21.0 | x | ○ | 0.5 | ○ |

As described above, the processing aid for vinyl chloride based resin and the vinyl chloride based resin composition using the aid improve processability of vinyl chloride based resin, eliminate flow marks generated on a calender-molded sheet or film or an extrusion-molded sheet or film, reduce exudation, and have an excellent effect on releasability of the calender-molded sheet, and their industrial value is extremely high.

What is claimed is:

1. A processing aid comprising:
   a copolymer (A) whose mean weight molecular weight (Mw) measured with gel permeation chromatography is in the range of from 700,000 to 2,000,000, and molecular weight distribution (Mw/Mn) is 3.0 or smaller, which is obtained by copolymerizing a monomer mixture comprising 70 to 90% by weight of methyl methacrylate, 10 to 30% by weight of acrylate or methacrylate other than methyl methacrylate, and 3% by weight or less of a different type of monomer capable of being copolymerized with those monomers; and
   a copolymer (B) whose mean weight molecular weight (Mw) measured with gel permeation chromatography is in the range of from 10,000 to 500,000, which is obtained by copolymerizing a monomer mixture comprising at least 30 to 50% by weight of methyl methacrylate, a monomer other than a polyfunctional monomer and having as constitutional units at least one type other than methyl methacrylate, and 2% by weight or less of polyfunctional monomers,
   wherein copolymer (A) and copolymer (B) are present in a ratio of 100 parts by weight of copolymer (A) to 0.5–100 parts by weight of copolymer (B).

2. A vinyl chloride based resin composition comprising 100 parts by weight of vinyl chloride based resin and 0.2 to 20 parts by weight of the processing aid as set forth in claim 1.

3. A calender molded product obtained with the processing aid as set forth in claim 1.

4. A calender molded product obtained by calender molding the vinyl chloride based resin composition as set forth in claim 2.

5. A method of producing moldings comprising calender molding the vinyl chloride resin composition as set forth in claim 2.

6. The processing aid as set forth in claim 1, wherein the methylmethacrylate in the monomer mixture of copolymer (A) is present in an amount of 80–90% by weight.

7. The processing aid as set forth in claim 1, wherein the monomer other than a polyfunctional monomer in the monomer mixture of copolymer (B) is present in an amount of 45–70% by weight.

8. The processing aid as set forth in claim 7, wherein said amount is 50–60% by weight.

9. The vinyl chloride based resin composition as set forth in claim 2, wherein the vinyl chloride based resin has a mean degree of polymerization of from 300–5,000.

10. The vinyl chloride based resin composition as set forth in claim 9, wherein said mean degree of polymerization is 500–3,000.

11. The calender molded product as set forth in claim 3, wherein the methylmethacrylate in the monomer mixture of copolymer (A) is present in an amount of 80–90% by weight.

12. The calender molded product as set forth in claim 3, wherein the monomer other than a polyfunctional monomer in the monomer mixture of copolymer (B) is present in an amount of 45–70% by weight.

13. The calender molded product as set forth in claim 12, wherein said amount is 50–60% by weight.

14. The calender molded product as set forth in claim 4, wherein the methylmethacrylate in the monomer mixture of copolymer (A) is present in an amount of 80–90% by weight.

15. The calender molded product as set forth in claim 4, wherein the monomer other than a polyfunctional monomer in the monomer mixture of copolymer (B) is present in an amount of 45–70% by weight.

16. The calender molded product as set forth in claim 15, wherein said amount is 50–60% by weight.

17. The method as set forth in claim 5, wherein the vinyl chloride based resin has a mean degree of polymerization of from 300–5,000.

18. The method as set forth in claim 5, wherein the vinyl chloride based resin has a mean degree of polymerization of from 500–3,000.

\* \* \* \* \*